(12) United States Patent
Dellecave et al.

(10) Patent No.: US 8,163,173 B1
(45) Date of Patent: Apr. 24, 2012

(54) WATER TREATMENT SYSTEM

(76) Inventors: Steven F. Dellecave, Naples, FL (US); Frank J. Scherer, Naples, FL (US)

( * ) Notice: Subject to any disclaimer, the term of this patent is extended or adjusted under 35 U.S.C. 154(b) by 456 days.

(21) Appl. No.: 12/460,293

(22) Filed: Jul. 16, 2009

Related U.S. Application Data

(60) Provisional application No. 61/135,000, filed on Jul. 16, 2008.

(51) Int. Cl.
C02F 1/78 (2006.01)

(52) U.S. Cl. ........ 210/123; 210/134; 210/151; 210/192; 210/259; 210/299

(58) Field of Classification Search .................. 210/104, 210/123, 124, 128, 134, 760, 744, 800–804, 210/255, 259–262, 295, 299, 192, 150–151; 261/DIG. 42; 422/186.07, 186.1
See application file for complete search history.

(56) References Cited

U.S. PATENT DOCUMENTS

| | | | | |
|---|---|---|---|---|
| 3,823,728 | A | * | 7/1974 | Burris .............................. 137/88 |
| 4,696,739 | A | * | 9/1987 | Pedneault ...................... 210/121 |
| 5,213,773 | A | * | 5/1993 | Burris ........................... 422/256 |

FOREIGN PATENT DOCUMENTS

| | | | | |
|---|---|---|---|---|
| JP | 02021997 | A | * | 1/1990 |
| JP | 09001131 | A | * | 1/1997 |

* cited by examiner

*Primary Examiner* — Terry Cecil
(74) *Attorney, Agent, or Firm* — William E. Noonan

(57) ABSTRACT

A well water treatment system includes a first ozonation tank that receives pressurized well water and introduces ozone into that well water. The ozone causes impurities to precipitate, which settle to the sides and bottom of the first tank. Remaining water is delivered by gravity flow to a second supply tank wherein the ozone is allowed to largely if not entirely dissipate from the water. When a household or other destination requires treated water, a pump in the supply tank operates to deliver water from the tank to that destination. The pump is operably positioned within the supply tank at an intermediate water level below precipitates floating on the surface and above precipitates that have settled in the tank.

12 Claims, 3 Drawing Sheets

WATER TREATMENT SYSTEM

RELATED APPLICATION

This application claims the benefit of U.S. Provisional Patent Application Ser. No. 61/135,000 filed Jul. 16, 2008.

FIELD OF THE INVENTION

This invention relates to a well water treatment system and, more particularly, to an improved system utilizing ozone to treat water derived from wells, municipal sources and rainwater harvesting systems.

BACKGROUND OF THE INVENTION

Many homeowners utilize well water for drinking, bathing, washing and various other household uses. Such water commonly contains all sorts of dissolved gases, metal ions, minerals, bacteria and/or other impurities. In order to render this water potable and suitable for household use, these impurities must be satisfactorily filtered or otherwise removed. Conventional filters have long been utilized to improve the quality of well water. Such filters are frequently lacking and often do not acceptably improve the smell, taste, clarity and/or cleanliness of the treated well water. Known filtration systems are also often inadequate for treating water derived from municipal sources and rainwater harvesting systems.

Ozone water purification has become an increasingly popular means for removing contaminants from well water and other water sources. Most existing ozone purification systems are intricate, bulky and quite expensive. In addition, when pipes, filters and other components of the water treatment system are subjected to prolonged contact with ozonated water, this can cause premature deterioration and damage to the system, which will usually necessitate expensive and inconvenient servicing and repairs. The need exists for a simple, yet versatile ozone purification system, which effectively treats and purifies water for household purposes and which, at the same time, largely removes the ozone from the treated water after the impurities have been eliminated through the ozone oxidation process.

SUMMARY OF THE INVENTION

It is therefore an object of the present invention to provide an improved well water treatment system utilizing a unique ozonation batch process for providing extremely clean and potable well water that is suitable for drinking and other household uses.

It is a further object of this invention to provide a water treatment system that effectively eliminates ozone after impurities have been oxidized and removed from the water so that the service life of filters, pipes and other components of the system are extended and costly maintenance is avoided.

It is a further object of this invention to provide a water treatment system that employs a relatively simple, inexpensive and uncomplicated, yet highly versatile set of modular components that are easy and convenient to arrange and construct according to the needs of a particular user.

It is a further object of this invention to provide a water treatment system wherein required repairs may be performed quickly, conveniently and relatively inexpensively utilizing modular and easy to replace components.

It is a further object of this invention to provide a water treatment system that effectively eliminates dissolved gases, minerals, metal ions, bacteria, microorganisms and other impurities so that the smell, clarity, taste and healthiness of the water are improved considerably.

It is a further object of this invention to provide a water treatment system that provides the foregoing benefits when used with various water sources including underground wells, municipal supplies and rainwater harvesting systems.

It is a further object of this invention to provide a water treatment system that enables a back-up or emergency water system to be quickly and safely implemented to provide a residence with clean, potable water in the event that the primary water system is inoperable.

This invention results from a realization that ozone introduced into a water treatment system should be removed as completely as possible after performing oxidation and purification in order to increase the longevity of the treatment system and plumbing components. We have also realized that this can be achieved by first allowing impurities to precipitate from the ozone treated water in a first tank and then delivering the ozonated water to a second tank under conditions of little or no turbulence wherein the ozone is allowed to disassociate from the treated water. This invention results from the further realization that treated water, which is largely free of impurities and ozone, may be effectively derived from the second tank by positioning a supply pump within the tank at an intermediate height, which is below floating precipitates and above settled precipitates, at a level for best accessing the cleanest water in the tank.

This invention features a water treatment system including a first tank into which untreated water is delivered. There is an ozonation apparatus engaged with the first tank for introducing ozone into the water accommodated within the first tank. Ozone generated in the first tank reacts with impurities in the water to form a precipitate within the first tank. The first tank is communicably connected to a second tank by a gravity flow conduit that permits water within the first tank to flow into a second tank under the force of gravity. At least some of the ozone in the water transmitted to the second tank dissipates or disassociates from the water within the second tank. A supply pump is disposed within the second tank and immersed within the water therein at an intermediate level of the supply tank wherein the cleanest water is located. The supply pump is communicably connected to a holding tank, faucet, hose bib, one or more filters and/or other destination for the treated water. When treated water is required at that destination, an appropriate signal is transmitted to the supply pump. This causes the supply pump to pump largely deozonated and purified water from the second tank to the destination requiring treated water.

In a preferred embodiment, the ozonation apparatus includes a tinier responsive to deactivation of the supply pump for operating the ozonation apparatus and introducing ozone into the water in the first tank for a predetermined time. The ozone generation apparatus may include an ozone generator and an ozonation pump that are operably interconnected by a venturi. The venturi includes an inlet that communicates with the water in the first tank and an outlet that is communicably connected to the ozonation pump. The pump recirculates water in the first tank and this water is ozonated within the venturi.

A source water supply conduit may be engaged with the first tank and have an aeration nozzle disposed above the water in the first tank. Typically, the source water includes a pressurized water supply. A solenoid valve may be interconnected to the source water supply conduit between the water source and the aeration nozzle. A pair of float switches may be mounted within the first tank. A first, upper one of the switches closes the solenoid valve when the water level in the first tank is at or above a predetermined level. Alternatively, the upper float switch causes the solenoid valve to open when the water level in the first tank drops below the predetermined level so that additional well water is delivered as needed to the first tank. A lower float switch deactivates the ozonation pump when the water level in the first tank is below the ozonation pump. This helps to avoid damage to the ozonation pump. In alternative embodiments, a mechanical float valve may be used to introduce source water as required into the ozonation tank.

The ozonation pump is preferably mounted in a pump saddle or otherwise, which supports the ozonation pump above a water depth in the first tank wherein most, if not all of the ozonated impurities have settled. Likewise, the supply pump is positioned within the second tank upon a pump saddle so that the supply pump draws relatively clean water from an intermediate region within the second tank disposed above the precipitates settled in the second tank and below precipitates floating in the second tank. The second tank may likewise include a float switch that deactivates the supply pump when the water level within the second tank is below a predetermined level. This reduces the risk that the supply pump will burn out when a low water level condition is experienced in the second tank.

One or both of the tanks may include a tank drain, which enables water to be removed from the tank as needed. Each drain is disposed proximate a bottom of its respective tank. A lid provides access to the interior of each tank so that the tank can be cleaned after it is drained.

A plurality of filters including, for example, carbon and mineral filters, may be connected to an outlet of the second tank. Likewise, a holding tank may be communicably joined to the outlet of the second tank. The charcoal and/or mineral filters, as well as the holding tank, may be communicably interconnected between the second tank and an ultimate destination for the treated water. The holding tank may include a pressure sensitive bladder tank. When the sensed pressure within the bladder tank is at or above a certain level, the bladder tank produces a signal that operates a pressure switch. The pressure switch, in turn, maintains the supply pump in a deactivated condition. If, however, the level of water in the holding tank drops below the predetermined level, this causes the pressure to activate the supply pump. Clean, treated water from an intermediate level of the tank is thereby delivered from the second tank to the holding tank, as well as to the charcoal and/or mineral filters. Both water impurities and ozone have been largely, if not entirely, eliminated from the water supply. Impurities and/or ozone that remain are further reduced by the filters. Effectively treated, extremely clean and noncorrosive potable water is thereby available for use by the residents. The filters, pipes and other components of the system are not overly taxed or prematurely damaged by prolonged contact with ozonated water or having to address excessive levels of impurities.

DETAILED DESCRIPTION OF PREFERRED EMBODIMENTS

Other objects, features and advantages will occur from the following description of a preferred embodiment and the accompanying drawings, in which.

Figure 1:
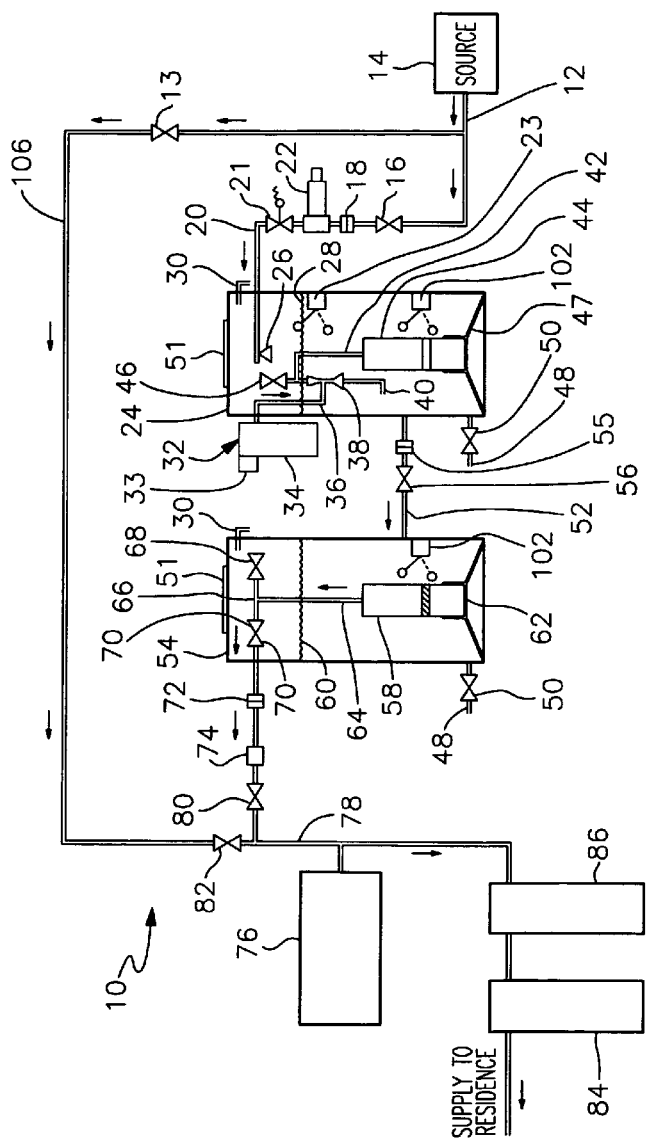
FIG. 1 is a diagrammatic view of a preferred water treatment system in accordance with this invention.
Figure 2:
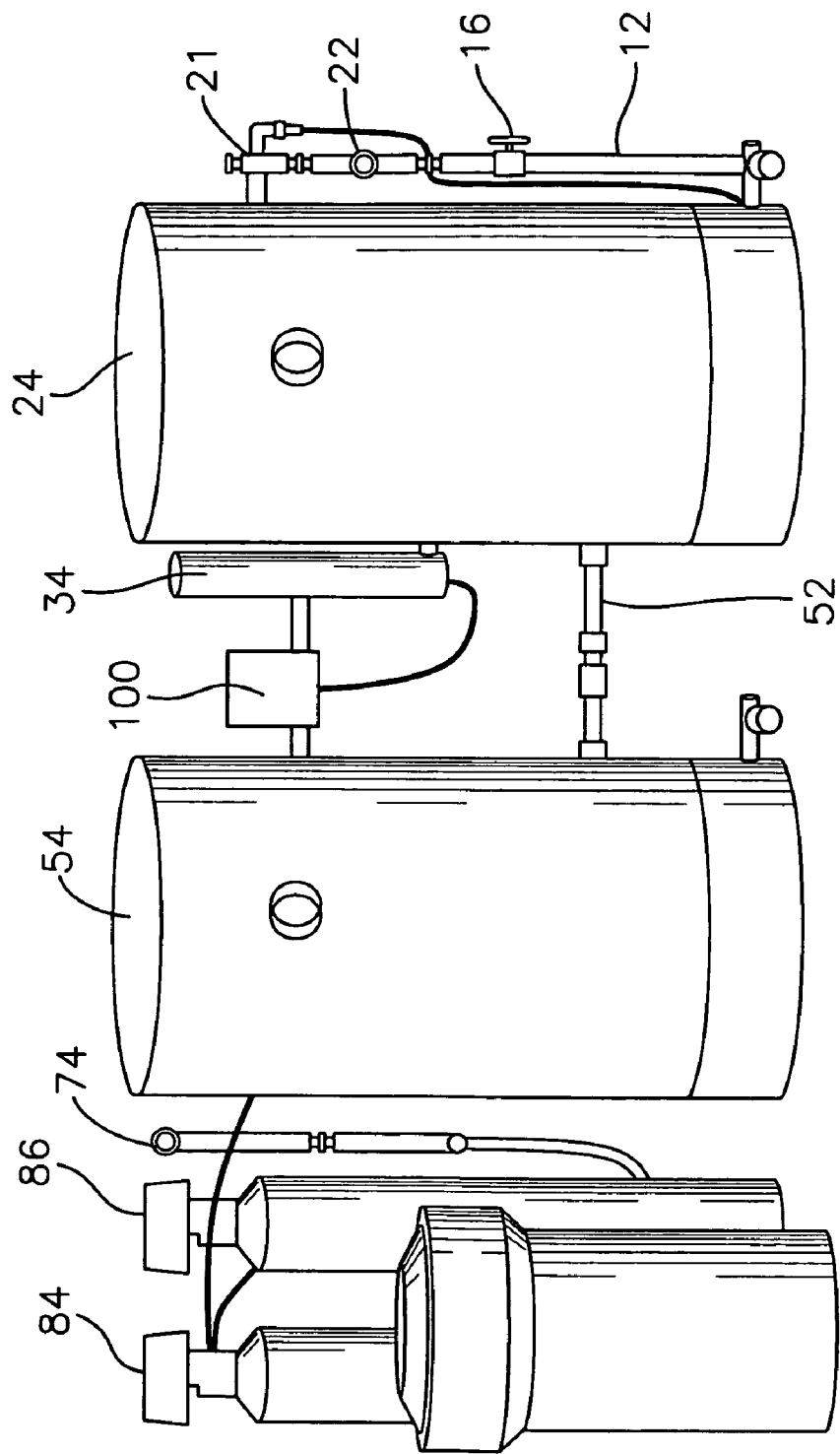
FIG. 2 is an elevational perspective view of the water treatment system of FIG. 1.

There is shown in FIGS. 1 and 2 a water treatment system 10 for households, businesses and other locations using the water for a potable water supply, which is safe for consumption, bathing, washing and other personal use. The system is designed to be used by various types of users and for various purposes requiring relatively pure and uncontaminated water. Nonetheless, the precise applications, settings and environments in which the system is used do not constitute a limitation of this invention.

The water to be treated by system 10 may be derived from any of various sources, including but not limited to, underground wells, public or municipal water supplies and rainwater collection or harvesting systems. The particular source of the water is not a limitation of this invention.

In particular, a first section of pipe 12 extends from water source 14 through an isolation valve 16. Pipe section 12 is joined by a conventional union 18 to a second section of pipe 20. Pipe section 20 includes a mesh filter 22, which is designed to mechanically filter large particles from the well water. Pipe section 20 joins and enters an upper end of a first ozonation tank 24. Pipe section 20 terminates in an aeration nozzle 26 disposed above a supply of water 28 in tank 24. The capacity and type of tank may vary within the scope of this invention to suit the required application.

A hose bib 13 is connected to pipe section 12. This bib allows for a hose or other conduit to be connected directly from the conduit 12 and joined to the residence while largely bypassing the components of system 10 in the manner described more fully below. This allows the system to be bypassed in the event one or more of the components of the system are not operational. As a result, water can be provided from the well to the residence or other destination in such an event.

A solenoid valve 21 is disposed in pipe section 20. This valve works in conjunction with an upper float switch 23 mounted within tank 24 to provide a desired level of water 28 in the tank. In particular, if the level of water is acceptably high, float switch 23 directs solenoid 21 to close so that no additional pressurized water is provided from the source 14 to tank 24. Alternatively, if the level of water 28 drops below a predetermined level, switch 23 operates to open solenoid 21. Pressurized water is thereby delivered through the conduit sections 12 and 20 into tank 24. In alternative embodiments, the upper float switch and solenoid may be replaced by a mechanical float valve disposed within the tank. When the water level in the tank drops below a predetermined level, the mechanical valve opens in a known manner so that pressurized well water is discharged to the ozonation tank.

An ozonation apparatus 32 is operably engaged with tank 24. In particular, the ozonation apparatus includes an ozone generator 34, which may comprise various known types of ozone generators. Ozone generator 34 is typically mounted to the outside of tank 24, as further shown in FIG. 2. The ozone generator is connected by a pipe 36 that extends into tank 24, to the standard nozzle (not shown) of a venturi 38, FIG. 1. Various known types of venturis may be employed including, but not limited to, the MAZZII brand venturi. The venturi includes an outlet 40 that is immersed in water 28. An inlet 42 communicably interconnects venturi 38 with an ozonation pump 44. This pump is supported by a pump saddle 47 above the floor of tank 24. An air relief valve 46 is also joined to the outlet of the venturi above the level of water 28. Pump 44 directs water 28 through inlet 42 and venturi 38 and this water pulls and entrains ozone from the nozzle of the venturi. This ozone is then discharged through outlet 40 and deposited in water 28 where it acts to precipitate and remove impurities as described below.

A discharge conduit 52 interconnects ozonation tank 24 with a second supply tank 54. See also FIG. 2. Conduit 52 allows water from tank 24 to flow into tank 54 by gravity flow. Typically, an isolation valve 56 and a union 55 (joining aligned conduit segments) are formed in conduit 52.

A supply pump 58 is immersed within water 60 in tank 54. Once again, supply pump 58 is elevated somewhat within tank 54 by a pump saddle 62. An outlet pipe 64 extends from pump 58 and joins a "T" connection 66 above the upper surface of water 60 within tank 54. One branch of the "T" terminates in a pressure relief valve 68. The other branch extends through a check valve 70 and exits tank 54. A union 72 communicably joins two segments of pipe. A pressure switch 74, also shown in FIG. 2, is operably interconnected to supply pump 58 in a manner that will be known to persons skilled in the art. Pressure switch 74 is also operably joined in a known manner to a bladder holding tank 76. More particularly, the supply pump delivers treated water, in the manner described more fully below, through outlet pipe 64 to a supply conduit 78. Conduit 78 is separated from the supply tank by an isolation valve 80. In addition, a hose bib 82 is joined to the supply conduit 78 for a purpose described below more fully below. Bladder holding tank 76 is likewise communicably joined to supply conduit 78 as are water softener/mineral filter 84 and carbon filter 86.

Each of the tanks 24 and 54 includes a respective drain 48 for emptying the tank of water as necessary. This is accomplished by opening a conventional valve 50. Draining the tank allows the tank to be inspected, cleaned or otherwise maintained. A lid 51 provides access to the interior of the tank. Each of the tanks 24 and 54 is also provided with a tank vent 30 that allows water to be introduced into and drawn from each tank without pressurization/vacuum problems.

In operation, water under pressure is supplied through inlet conduits 12 and 20 from source 14 to tank 24. Valve 16 is open. Large particles are collected by mesh filter 22. Well water is delivered through impact aeration nozzle 26 into the reservoir of tank 24. Water delivered through nozzle 26 impacts the water 28 already within the tank. This drives at least some hydrogen sulfide out of the water.

Ozone generator apparatus 32 is activated by a timer 33 to operate and produce ozone for a predetermined period of time. Timer 33 is itself activated each time supply pump 58 halts operation. This is described more fully below. As timer 33 runs, generator 34 produces ozone in a conventional manner. At the same time, ozonation pump 44 is activated for the predetermined duration set within timer 33. Pump 44 draws water through the venturi 38. This water picks up ozone from the venturi nozzle or orifice at the end of pipe 36. The ozonated water is then pumped back into the water 28 within the tank. The ozone reacts with impurities in water 28. Dissolved gases, metal ions, bacteria, viruses, microorganisms and other impurities are oxidized. Many of these impurities precipitate and settle upon walls and in a lower portion of tank 24 below pump 44. As a result, water 28 is significantly cleaned within tank 24. As previously indicated, water 28 is held at a predetermined level within tank 24 by the operation of float switch 23 and solenoid 21 (or alternatively by a mechanical float switch).

Whenever the level of water 60 within supply tank 54 is below the water level in ozonation tank 24, water in tank 24 is transmitted by gravity flow through conduit 52 from tank 24 to tank 54. This water has already been ozonated and a significant amount of impurities have been removed and settled within tank 24. Most of the precipitated contaminants settle below elevated pump 44 and gravity flow conduit 52. As a result, effectively treated water flows into supply tank 54.

Nonetheless, some contaminants typically remain in the transmitted water. Further removal of such contaminants is advantageous. It is desirable to also eliminate as much of the remaining ozone from water 60 as possible. Otherwise, such ozone may remain in the pipes, filters or other components of the water treatment system and/or household plumbing for an indefinite time. Eventually, this can cause damage to these components.

Tank 54 effectively and uniquely facilitates dissipation of the ozone from water 60. Because the water is entering tank 54 from tank 24 through the use of a gravity flow conduit 52, little or no turbulence is generated in the incoming water. This permits the ozone remaining in the water to effectively dissipate from the water in a fairly brief time. This occurs as the ozone naturally decays and reverts to oxygen. At the same time, remaining oxidized precipitates that form in water 60 tend to either settle to the bottom of tank 54 or rise to and float on the surface of the water in the tank. Pump 58 is positioned advantageously at an intermediate height within tank 54 and supported at that position by pump saddle 62. This intermediate position is generally above the bottom level or layer at which precipitates settle within the tank and below an upper layer of water that contains precipitates floating proximate the surface of the water in the tank. The intermediate level of the water at which pump 52 is immersed is extremely clean and substantially free of both impurities and ozone. The inlet of pump 52 is positioned at this level to draw clean water when the pump operates.

Holding bladder tank 76 provides water as needed to the household or other destination. When such water is utilized, and depleted from bladder tank 76, this decreases the pressure in the tank. Eventually, this pressure drop is sensed by pressure switch 74. Switch 74 is activated to operate pump 58. The supply pump draws treated water from the largely clean intermediate portion of tank 54 and delivers such water through conduits 64 and 78 to tank 76. Eventually, when additional water is required by the household, it is drawn from tank 76 through mineral and carbon filters 84 and 86, which remove further minerals and chlorine respectively to yield extremely clean, healthy, safe and aesthetically pleasing potable water supply. These filters are typically disposed in respective tanks, shown in FIG. 2, which are provided with automatic backwash. Such filters will be known to persons skilled in the art.

It should be understood that the ozone generator apparatus 32 associated with tank 24 operates only for a predetermined timed sequence initiated by timer 33. This timing sequence commences only upon deactivation of supply pump 58. The ozonation apparatus, supply pump, pressure switch 74 and timer 33 are operably interconnected through a control box 100, shown in FIG. 2. A suitable microprocessor may be employed to program and adjust the various operations. The details of the circuits utilized to control and operate the various components of the system are not specifically depicted, but will be understood by those skilled in the art.

When tank 76 is refilled in the previously described manner, the pressure in the tank increases until pressure switch 74 is deactivated. This turns off supply pump 58. As soon as the supply pump stops, the controls direct timer 33 to commence operation. This causes the ozonation generator apparatus 32 to operate in the previously described manner for a predetermined time. That time may be increased in locales where conditions warrant additional purification is required. The production of ozone will continue in tank 24 until timer 33 times out.

Each tank 24, 54 is provided with a low water level float switch 102. During drought conditions, or when one or more components of the system malfunction, it is possible that the water level in one or both tanks may drop below a predetermined emergency low level. In such cases, float switch 102 operates through controller 100 to deactivate the pump 44, 58 in its respective tank. This prevents accidental burnout of the pumps.

As previously indicated, in cases where one or more components of system 10 are inoperable, tanks 24 and 54 may be bypassed. A hose 106 may be interconnected between hose bib 13 in conduit segment 12 and hose bib 82 connected conduit segment 78. At such times, water is thereby provided from well 14 directly to holding tank 76. Water filtration is then provided exclusively by filters 84 and 86.

Figure 3:
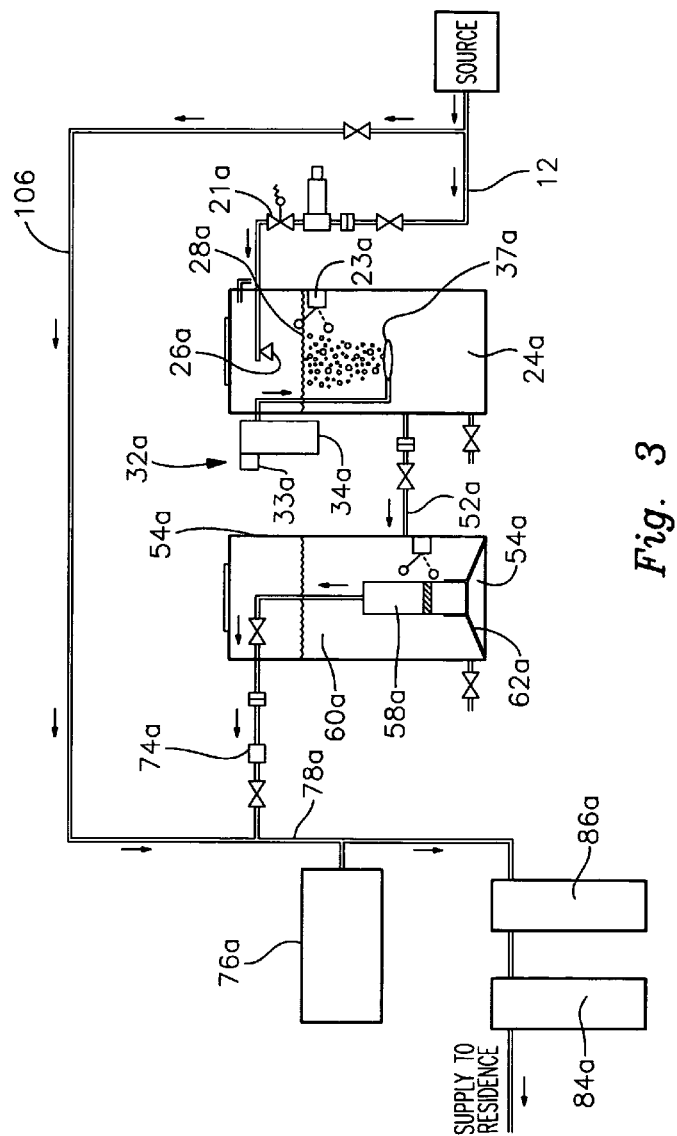
FIG. 3 is a schematic view of an alternative water treatment system according to this invention.

FIG. 3 depicts an alternative well water treatment system utilizing an ozonation tank 24a and a supply tank 54a. In this embodiment, a bypass line 106 is installed permanently between incoming segment 12a and supply conduit segment 78a. Ozone generator 32a includes an ozone generator 34a as previously described. Instead of using a venturi and ozonation pump, apparatus 32a employs a conventional diffuser 37a. Supply tank 54a again employs a supply pump 58a mounted on a pump saddle 62a. The supply pump is again positioned at an intermediate height or level within tank 54a.

The version of FIG. 3 operates analogously to the previously described embodiment. Whenever float switch 23a senses that the water 28a in tank 24a has fallen below a predetermined level, it directs solenoid 21a to open so that additional water is supplied from the source into tank 24a through impact aeration nozzle 26a. A mechanical float valve may again be substituted for controlling the volume of water in tank 24a. As soon as supply pump 58a halts operation, timer 33a directs ozone generator 34a to produce ozone within water 28a. This oxides and purifies the water in tank 24a. Impurities precipitate and settle onto the walls of the tank and into a lower portion of 24a.

Water from which impurities have been largely removed is delivered by gravity flow through line 52a to tank 58a. Once again, the water is delivered to an area of low turbulence. As a result, ozone remaining in the water 60a in tank 54a disassociates from the water. Remaining precipitates tend to either settle to the bottom of the tank or float toward the surface of the water. Pump 58a is supported at an intermediate level where the water is cleanest.

When bladder tank 76a senses a need for additional water, pressure switch 74a again operates through appropriate circuitry to activate pump 58a. This delivers water through line 78a to tank 76a. The deozonated treated water is then delivered through mineral and carbon filters 84a and 86a to the household in the previously described manner. Because both ozone and impurities have been largely removed from the water, the filters 84a and 86a are not overly stressed or prematurely damaged. They exhibit a long service life. Maintenance and replacement costs are reduced considerably.

Otherwise, the version shown in FIG. 3 is constructed and operates analogously to the previously described embodiment. Various features such as drains, switches and valves may be varied somewhat or changed within the scope of this invention.

The water treatment system is especially convenient to use in conjunction with an emergency back-up water source. For example, the residence may employ a rainwater harvesting system that collects rainwater and holds this rainwater in a conventional cistern or underground tank for use in the event that a well or other primary water source is unavailable. The treatment system of this invention serves to effectively clean the water in the cistern so that it is safe to use in the residence.

Accordingly, the water treatment system of this invention effectively removes impurities through a unique batch ozonation process. In a first tank, the impurities are ozonated and allowed to precipitate out of the water. A second supply tank is then provided that uniquely allows the ozone to largely dissipate out of the water while additional impurities precipitate before the treated water is delivered to the household or other destination requiring potable water. This is particularly accomplished due to the unique placement of the supply pump in the second, supply tank at an intermediate level below precipitated contaminants floating on the top of the water and above the settled precipitate. Allowing ozone to dissipate naturally from the treated water in the supply tank significantly prolongs the service life of pipes, filters and other components of the user's water treatment system.

From the foregoing it may be seen that the apparatus of this invention provides for a water treatment system and, more particularly, to an improved system that utilizes ozone to purify well water so that the water is potable. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A system for treating water from a water source, said system comprising:
    a first tank into which water from the water source is delivered;
    an ozonation apparatus engaged with said first tank for introducing ozone into the water in said first tank, at least a portion of which ozone reacts with impurities in the water to form precipitates in said first tank, at least some of the precipitates settling in said first tank, said ozonation apparatus including an ozone generator and an ozonation pump operably interconnected by a venturi, said ozonation pump being supported within said first tank upon an elevated surface of an ozonation pump support member above a water level at which most of the precipitants formed in said first tank have settled below;
    a second tank communicably connected to said first tank by a gravity flow conduit for transmitting ozonated water from said first tank to said second tank under the force of gravity, said second tank allowing precipitates remaining in the water to either float or settle in respective layers of water in said second tank and further permitting previously unreacted ozone to dissipate from the water in said second tank;
    a supply pump immersed within the water in said second tank and supported in said second tank upon an elevated surface of a supply pump support member at a level for drawing relatively clean, treated water disposed in said second tank intermediate the respective layers of water containing settled and floating precipitates and pumping the treated water to a destination communicably connected to said supply pump and requiring treated water;
    a holding tank for communicably interconnecting said supply pump and the destination requiring treated water;

a pressure switch operably connected to said holding tank for activating said supply pump when pressure in said holding tank falls below a predetermined level and deactivating said supply pump when pressure in said holding tank rises to said predetermined level;

a controller for activating and deactivating said ozonation apparatus whereby ozone is introduced into the water in said first tank when said ozonation apparatus is activated; and means for maintaining water in said first tank at a predetermined level.

2. The system of claim 1 in which said venturi includes an inlet that communicates with the water in said first tank and an outlet that is communicably connected to said ozonation pump, said ozonation pump recirculating water in said first tank, which water is ozonated within said venturi.

3. The system of claim 1 in which a source water supply conduit is communicably connected to said first tank and has an aeration nozzle disposed above the water in the first tank.

4. The system of claim 3 in which the water source is pressurized.

5. The system of claim 4 in which the water level maintaining means comprises (i) a solenoid valve interconnected to the source water supply conduit between the water source and said aeration nozzle, and (ii) a water level float switch mounted within said first tank, said water valve float switches for closing said solenoid valve when the water level in said first tank is at or above a predetermined level and opening said solenoid valve when the water level in said first tank is below said predetermined level to deliver additional water from the source to said first tank.

6. The system of claim 1 further including an ozonation pump float switch mounted within said first tank for deactivating said ozonation pump when the water level in said first tank is below said ozonation pump.

7. The system of claim 1 in which said second tank carries a float switch for deactivating said supply pump when the water level in said second tank is below a predetermined level.

8. The system of claim 1 in which at least one of said tanks includes a drain, located proximate a bottom of said tank for enabling water to be drained selectively from said tank.

9. The system of claim 1 in which at least one of said tanks includes a removable lid for providing access into said tank.

10. The system of claim 1 further including at least one filter interconnected between said supply pump and the destination requiring treated water for filtering the water pumped from said second tank to the destination.

11. The system of claim 10 in which said filters include at least one of a charcoal filter and a mineral filter.

12. The system of claim 1 further including a water outlet formed in said second tank, said outlet being communicably connected to the destination requiring treated water, said pump for delivering treated water through said outlet to the destination.

* * * * *